S. G. REED.

TIRE HEATING APPARATUS.

No. 7,589. Reissued April 3, 1877.

Witnesses.

W. J. Pratt.

S. C. Perkins

Inventor

Samuel G. Reed per Lewis & Gregory Att'ys.

N. PETERS, PHOTO-LITHOGRAPHER, WASHINGTON, D. C.

UNITED STATES PATENT OFFICE.

SAMUEL G. REED, OF WELLESLEY, MASSACHUSETTS.

IMPROVEMENT IN TIRE-HEATING APPARATUS.

Specification forming part of Letters Patent No. 158,522, dated January 5, 1875; reissue No. 7,589, dated April 3, 1877; application filed March 21, 1877.

*To all whom it may concern:*

Be it known that I, SAMUEL G. REED, of Wellesley, in the county of Norfolk and State of Massachusetts, have invented Improvements in Apparatus for Heating Wheel-Tires by the Use of Gas, of which the following is a specification:

The object of my invention is to heat wheel-tires to facilitate setting them on or removing them from wheels; and the invention consists in a gas-receiver provided with a circular series of tube-receiving sockets, in combination with a series of burners mounted at the end of a tube, and adapted to be moved or adjusted in position with relation to the gas-receiver, to place the burners of the series in arcs of circles of different diameters, according to the diameter of the tire to be heated; also, in connection with the above, a series of radial arms to support the tire being heated, and also in a reversible head to carry the burners.

Figure 1:
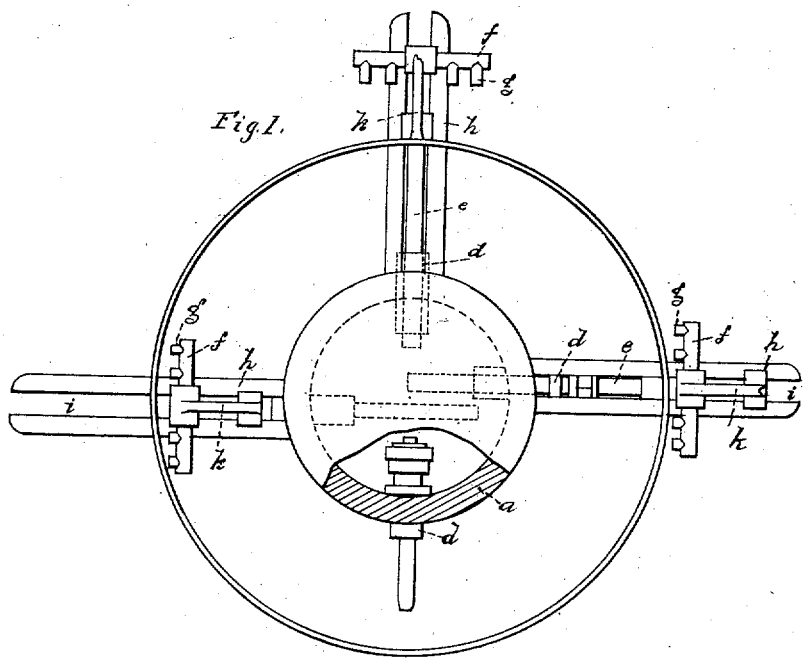
Figure 2:
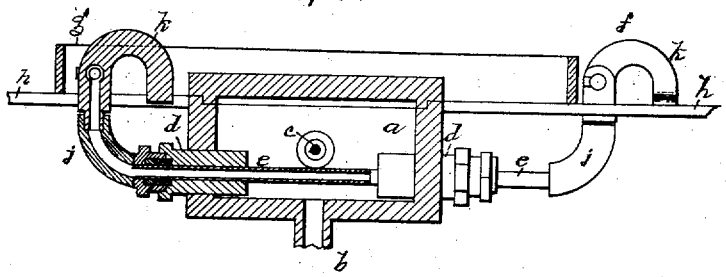

Figure 1 represents my invention in plan view, and Fig. 2 a section thereof.

In the drawing, *a* represents the gas-receiver, supplied with gas at its side or at its periphery through a suitable opening, *b* or *c*. A series of hollow sockets, *d*, radiate from the gas-receiver, and within them are placed metallic tubes *e*, the connection between the tubes and sockets being gas-tight, and so as to permit one to slide within the other. Heads *f*, provided each with several gas burners, *g*, are fitted at the outer ends of the adjustable tubes *e*, and these heads and burners may be moved with relation to the gas-receiver to place the series of heads and burners in the arc of a circle of the diameter requisite to adapt the burners to the diameter of the tire being heated. The tire is placed on and supported by radial arms *h*, (shown as slotted at *i*,) the arms also supporting the burners outside of the gas-receiver. The heads *f* are shown as joined with elbows *j*, in such manner as to permit the heads to be turned, in order to bring the gas-burners *g* in position to operate either on the outer or inner face of the tire, as shown in the drawings, and it will be noticed that the feet or guards *k*, acting in connection with the supports *h*, serve to retain the burners at substantially right angles, and with their open ends in proper position with relation to the face of the tire.

These burner-heads and feet, to retain the burners at the proper angle with relation to the tire, may be connected with the gas-receiver by means of flexible tubes, or such flexible tubes may be connected with a circular pipe or tube.

The sockets *d* are shown as provided with packed boxes to receive the tubes *e*. Any desired number of heads and tubes may be employed.

Heads *f* may be turned in the feet or guards *k*. The guards may and will preferably be placed with relation to the burners as at the top of Fig. 1, the guard then protecting the burners from being struck by the tire.

I claim—

1. A gas-receiver and a series of radially-adjustable heads, burners, and tubes, in combination with the slotted supports for the tire, and the heads and burners, substantially as described.

2. The head and its series of burners, in combination with the foot or guard to retain the gas-burners at the proper position with reference to the tire, and guard the burners, substantially as described.

3. A gas-receiver and tube-receiving sockets, in combination with a series of tubes made radially adjustable with relation to the sockets and with gas-burners, to permit the gas-burners to be moved to direct their flame on large or small tires, substantially as described.

4. A gas-receiver and tubes and adjustable heads, each provided with a series of burners, in combination with slotted supports to sustain the heads and burners, and permit their adjustment in radial lines to discharge the gas-flame against the tire to be heated, all substantially as described.

SAMUEL G. REED.

Witnesses:

G. W. GREGORY,

W. J. PRATT.